(12) United States Patent
Uchiyama

(10) Patent No.: US 6,438,828 B1
(45) Date of Patent: Aug. 27, 2002

(54) WATERPROOFING ARRANGEMENT FOR WIRE HARNESS

(75) Inventor: Kenichi Uchiyama, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 09/480,256

(22) Filed: Jan. 11, 2000

(30) Foreign Application Priority Data

Jan. 14, 1999 (JP) .......................................... 11-008479

(51) Int. Cl.[7] .............................................. H01R 43/00
(52) U.S. Cl. ............................. 29/868; 29/458; 29/858; 29/873; 29/877; 29/881; 29/33 E; 174/76; 174/152 G
(58) Field of Search ....................... 29/825, 447, 458, 29/858, 868, 873, 874, 877, 881; 174/76, 152 G

(56) References Cited

U.S. PATENT DOCUMENTS

| | | | |
|---|---|---|---|
| 4,020,546 A | * | 5/1977 | May .............................. 29/628 |
| 4,797,513 A | * | 1/1989 | Ono et al. ................... 174/153 |
| 4,928,349 A | * | 5/1990 | Oikawa et al. .................. 16/2 |
| 5,270,487 A | * | 12/1993 | Sawamura ................. 174/31 R |
| 5,335,408 A | * | 8/1994 | Cobb ............................ 29/447 |
| 5,499,823 A | * | 3/1996 | Fukui ............................. 277/1 |
| 5,641,942 A | * | 6/1997 | Iriyama et al. ............ 174/72 A |
| 6,010,134 A | * | 1/2000 | Katoh ......................... 277/615 |
| 6,225,562 B1 | * | 5/2001 | Fujishita et al. ............... 174/76 |

FOREIGN PATENT DOCUMENTS

| | | | |
|---|---|---|---|
| DE | 3903059 | | 8/1990 |
| EP | 320 891 | | 6/1989 |
| JP | 08-116615 | | 5/1996 |
| JP | 10-172360 A | * | 10/1996 |
| JP | 09-233652 | | 9/1997 |
| JP | 10-135657 | | 5/1998 |
| JP | 10-224960 | | 8/1998 |
| JP | 0008479 A | * | 1/1999 |
| JP | 165061 A | * | 6/2000 |

* cited by examiner

Primary Examiner—Carl J. Arbes
Assistant Examiner—Minh Trinh
(74) Attorney, Agent, or Firm—Banner & Witcoff, Ltd.

(57) ABSTRACT

A sealant is applied to electric wires which comprise a wire harness at a location where a portion of this wire harness passes through a narrow diameter cylindrical member 6a of a grommet 6. An outer circumference of this portion to which the sealant has been applied is covered by a sheet 11. Both open ends along a length-wise direction of this sheet are bound by tape 13 and 14, the bound portions of this tape preventing the sealant from escaping to the exterior. In the portion between the tapes, the sealant is forced to permeate into the cross-sectionally central portion of the wire harness. The tapes 13, 14 also act as a positioning aid.

8 Claims, 3 Drawing Sheets

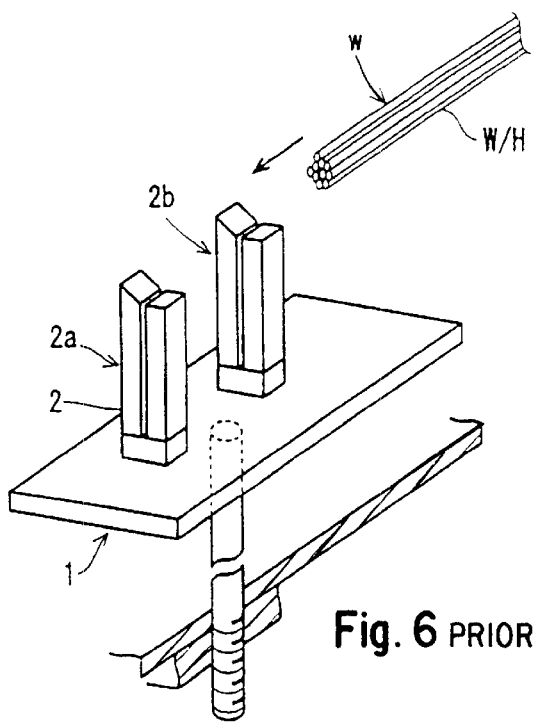
Fig. 6 PRIOR ART
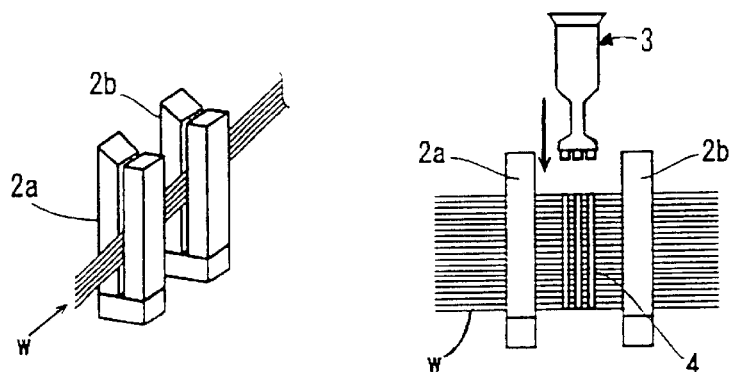
Fig. 7 PRIOR ART
Fig. 8 PRIOR ART
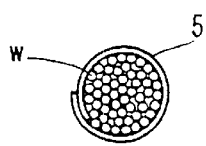
Fig. 9 PRIOR ART
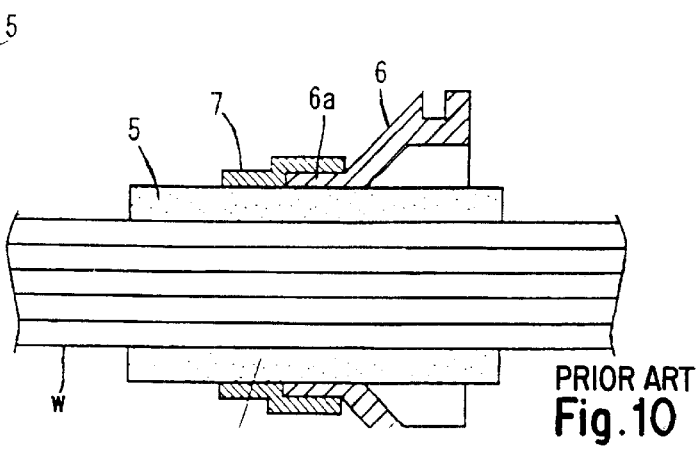
Fig. 10 PRIOR ART

WATERPROOFING ARRANGEMENT FOR WIRE HARNESS

TECHNICAL FIELD

The present invention relates to a configuration and method for water-proofing a wire harness passing through a grommet installed in a panel through hole of an automobile.

BACKGROUND OF THE INVENTION

In the case where a wire harness passes through a panel which divides an engine compartment and the interior of an automobile, a grommet made from rubber or elastomer is installed in a through hole passing through the panel. The wire harness passes through this grommet, and water etc. is thereby prevented from entering the interior.

An outer circumference of a wide diameter member of the grommet has a panel engaging groove provided thereon. This groove engages an inner circumference edge of the panel through hole and the space between the grommet and the panel through hole is thus reliably sealed against moisture. A narrow diameter member of the grommet tightly receives the wire harness. The narrow diameter member is usually provided on the engine compartment side and prevents water etc. from entering the grommet.

However, if spaces exist between electric wires of the wire harness and between the wire harness and the grommet, water may pass from the engine side to the interior. Various measures have been used in the past to deal with this, such as filling the grommet with a sealant, etc.

The present inventor has previously provided the simple process of coating the electric wire spaces with a waterproofing material while the wire harness is on the assembly table, as described in JP-10-135657. As FIGS. 6–8 of this application show, in this method, on an assembly table 1, a jig 2 formed on a wire harness path is provided with a pair of electric wire supports 2a and 2b. A group of electric wires w comprising a wire harness W/H are singulated and pass through these electric wire supports 2a and 2b. While the electric wires w are supported in an aligned manner by the electric wire supports 2a and 2b, a viscous or non-liquid sealant 4 comprising silicone or the like is applied by a nozzle 3 or a brush to the electric wires w. Then, as shown in FIGS. 9 and 10, the outer circumference of the part coated with the sealant 4 is wrapped in a closed cell foam sheet 5 or a film so as to form a circular shape, and in this state the harness is passed through a grommet 6. Then an open end of a narrow diameter cylindrical member 6a of the grommet 6 is fixed to the sheet 5 with tape 7.

The above method has the advantage of being performed on a wire harness assembly table, on the wire harness assembly line. However, as shown in FIG. 11, in the case where a portion of the electric wires w supported in an aligned manner by the electric wire supports 2a and 2b crosses and becomes twisted, a space C occurs. The sealant 4 does not fill this space C and an uncovered portion C' will remain. Consequently, as shown in FIG. 12, even though the electric wires w are covered by the sheet 5 and are formed into a circular shape, the space C may not be filled with the sealant 4 due to the high viscosity thereof.

As shown in FIG. 13, the filled portion is next fastened along the narrow diameter cylindrical member 6a of the grommet 6 and the sealant 4 is urged into the portion C'. However, the movement of the sealant 4 in a length-wise direction X of the electric wires is greater than the penetration of the sealant 4 in a cross-sectionally central direction Y of the wire harness. Consequently, if the central portion of the electric wires of the wire harness has the uncovered portion C', the sealant 4 often does not penetrate into that portion and merely passes along the length-wise direction of the electric wires. As a result, the uncovered portion C' will remain unsealed.

The present invention has been developed after taking the above problem into consideration, and aims to prevent the sealant from passing along the length-wise direction of electric wires, instead causing the sealant to penetrate in the cross-sectionally central direction of the wire harness, this invention reliably preventing portions from remaining unfilled with sealant.

SUMMARY OF THE INVENTION

According to the invention there is provided a method of sealing a wire harness in a grommet against the passage of moisture, the method comprising the steps of:

a) collating a bundle of wires;

b) coating the exterior of a predetermined length of said bundle with a viscous sealant;

c) wrapping said bundle with a sheet so as to cover said predetermined length and end portions on either side thereof;

d) tightly binding said end portions to confine said sealant and prevent escape thereof; and e) inserting said predetermined length of said bundle into a tight fitting grommet of resilient material, such that the sealant is forced to permeate throughout said bundle.

Such a method both confines the sealant, and places it under resilient loading within the grommet. In this way permeation of the sealant throughout the bundle can be assured.

Preferably the end portions are bound with adhesive tape, which may be a contrasting colour in order to ensure correct relative location of grommet and wire harness. The harness and grommet may subsequently be bound together, for example by utilising a projection of the grommet extending along the length of the wire bundle. The grommet may include internal projections, preferably annular, to apply circumferential pressure to the wire bundle at specified locations.

BRIEF DESCRIPTION OF DRAWINGS

Other features of the invention will be apparent from the following description of a preferred embodiment shown by way of example in the accompanying drawings in which:

FIG. 6 is diagonal view showing a conventional example;

FIGS. 7 and 8 illustrate the method of the conventional example;

FIG. 9 is a cross-sectional view of the conventional example;

FIG. 10 is a plan view showing sealant is applied to the conventional example.

DESCRIPTION OF PREFERRED EMBODIMENTS

Figure 1:
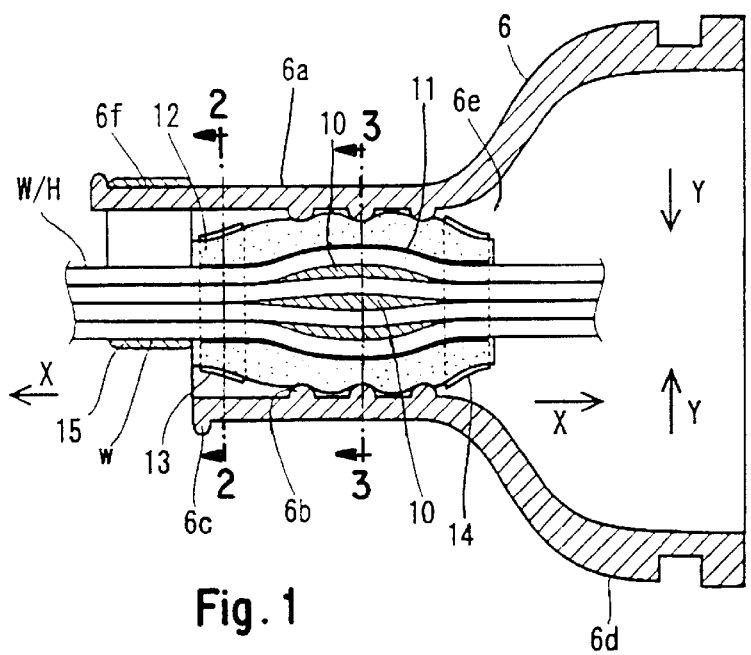
FIG. 1 is a cross-sectional view through an embodiment of the invention.
Figure 2:
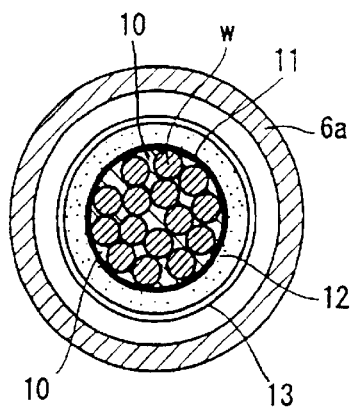
FIG. 2 is a cross-section of FIG. 1 on line 2—2.
Figure 3:
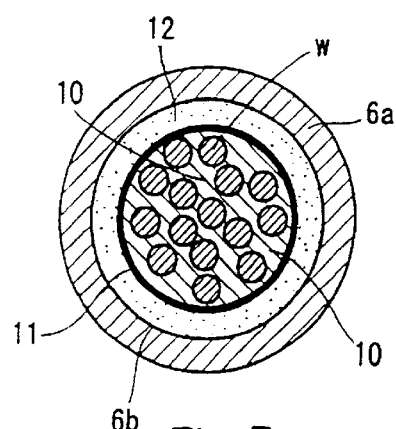
FIG. 3 is a cross-section of FIG. 1 on line 3—3.

An embodiment of the present invention is described below with the aid of FIGS. 1–5. A group of electric wires w comprise a wire harness W/H. Silicone 10, functioning as a sealant, is applied to a portion of this wire harness W/H where it passes through a narrow diameter cylindrical member 6a of a black grommet 6. An outer circumference of this silicone-coated portion 11 is covered with a closed cell urethane sheet 12. Openings at both ends of this urethane sheet 12 are bound tightly by yellow tape 13 and 14 made from vinyl chloride.

Figure 4:
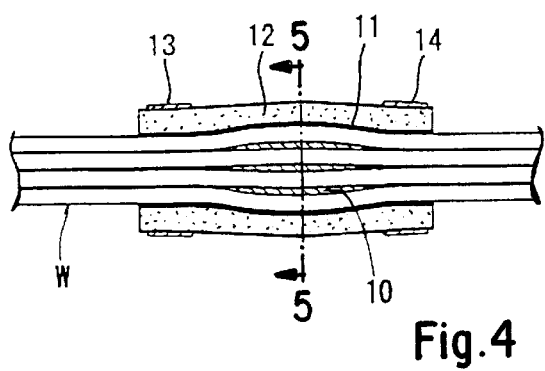
FIG. 4 is a cross-sectional view showing a state whereby a group of electric wires are filled with silicone, a sheet being attached and bound with tape.
Figure 5:
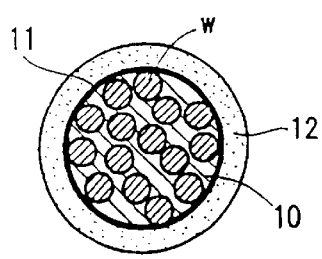
FIG. 5 is a cross-sectional view of FIG. 4 on line 5—5.
Figure 11:
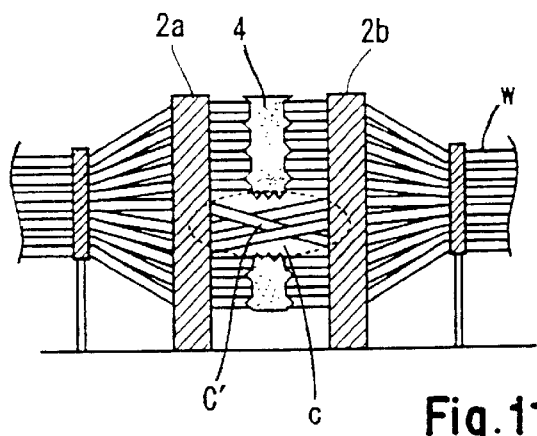
FIGS. 11–13 illustrate the conventional example.
Figure 12:
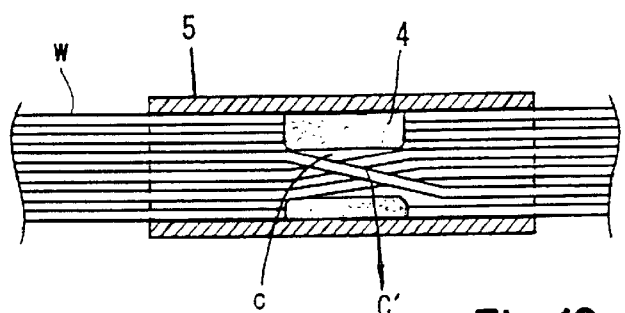
Figure 13:
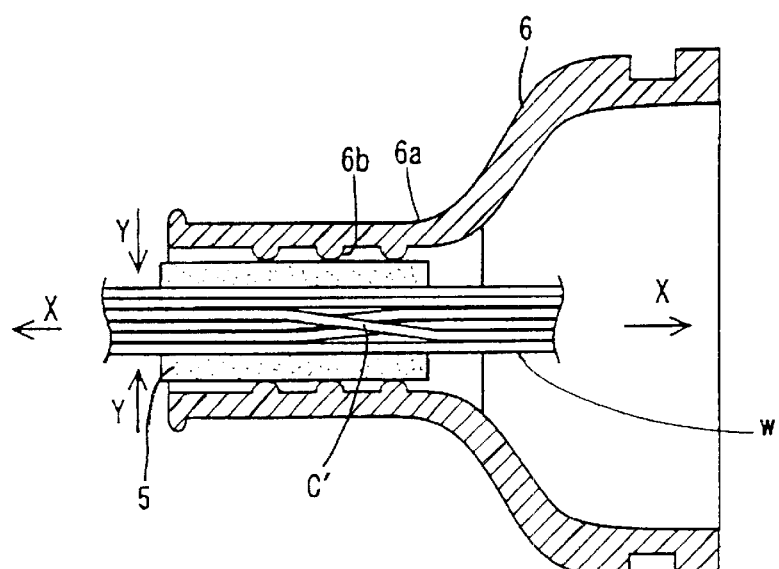

As shown in FIGS. 4 and 5, an end of the urethane sheet 12 is positioned at a location corresponding to an end opening 6c of the narrow diameter cylindrical member 6a of the grommet 6 and the tape 13 is attached. The tape 14 is attached to the other end thereof. The end opening 6c of the narrow diameter cylindrical member 6a of the grommet is positioned to correspond to an inner edge of the tape 13. In this state, the position of the other end of the urethane sheet 12 corresponds to an end 6e of the narrow diameter cylindrical member. This end 6e of the narrow diameter cylindrical member joins with a wide diameter member 6d of the grommet. After the position of the inner edge of the tape 13 is made to correspond to the end opening 6c of the narrow diameter cylindrical member 6a of the grommet 6, a tape 15 is would around both a tape-winding protrusion 6f which extends from a portion of the end opening 6c and the electric wires w, thereby fixing the grommet 6 and the electric wires w of the wire harness.

In this manner, the grommet 6 is attached to the wire harness W/H, and the silicone-coated portion 11, to which the silicone 10 has been applied and around which the urethane sheet 12 has been wrapped, fits tightly with the narrow diameter cylindrical member 6a of the grommet. The diameter of the narrow diameter cylindrical member 6a is less than the diameter of the electric wires w and so the narrow diameter cylindrical member 6a fits closely with the urethane sheet 12, and ribs 6b within the narrow diameter cylindrical member 6a press into this urethane sheet 12.

As a result, the silicone 10 which fills the interior of the urethane sheet 12 is encouraged to penetrate in a length-wise direction X of the electric wires. Both ends, in a length-wise direction, of the urethane sheet 12 are however tightly bound by the tape 13 and 14. This tape 13 and 14 prevents the silicone 10 from escaping to the exterior and consequently, the silicone 10 penetrates into the cross-sectionally central direction Y of the electric wires w of the wire harness. As a result, if portions among the electric wires w remain unfilled, the silicone 10 will penetrate into these unfilled portions, and thus the harness will be reliably sealed.

As shown in FIGS. 4 and 5, the configuration is such that the closed cell urethane sheet 12 is wrapped around the wire harness, and both ends thereof are bound with the tape 13 and 14 until they are fixed. This prevents the sealant from escaping to the exterior, and the sealant can be forced to permeate into the center of the wire harness.

Moreover, since the sealant is prevented from escaping to the exterior by binding, the operability and external appearance are improved. Furthermore, the attachment position of the grommet can be made more accurate due to the position of the tape, which can be of any contrasting colour with respect to the grommet.

What is claimed is:

1. A method of sealing a wire harness in a grommet against the passage of moisture, the method comprising the steps of:
   a) collating a bundle of wires;
   b) coating the exterior of a predetermined length of said bundle with a viscous sealant;
   c) wrapping said bundle with a sheet so as to cover said predetermined length;
   d) tightly binding the sheet about the wires with a binding member wrapped about the sheet to each side of the predetermined length of the sealant coating the wires to confine said sealant between the binding members and prevent escape thereof;
   e) providing a tight fitting grommet of resilient material having annular ribs that extend into an interior of the grommet and an opening at one end thereof defined by a projecting portion formed by a long segment and a short segment, the long segment extending beyond the short segment in an axial direction;
   f) inserting said predetermined length of said bundle following the binding step into the opening of the tight fitting grommet so that the annular ribs press into the sheet to force the sealant to permeate throughout said bundle of wires; and
   g) tightly binding the long segment of the grommet to the bundle of wires with a binding member.

2. A method according to claim 1 including a step of aligning one end of the sheet with an end of said grommet.

3. A method according to claim 1 further including a step of aligning one end of the sheet with a free end of the short segment of said grommet.

4. A method according to claim 1 wherein the binding members in the step of tightly binding said sheet include adhesive tape.

5. A method according to claim 4 including the step of selecting an adhesive tape of a contrasting colour to said grommet.

6. A method according to claim 4 including the step of selecting an adhesive tape of a contrasting colour to said sheet.

7. A method according to claim 5 including the step of selecting an adhesive tape of a contrasting colour to said sheet.

8. A method according to claim 1 including the steps of selecting a viscous sealant of silicone, and a sheet of closed cell urethane.

* * * * *